US012645871B2

(12) United States Patent
Mackey

(10) Patent No.: US 12,645,871 B2
(45) Date of Patent: Jun. 2, 2026

(54) PRIVACY-CONTROLLED GENERATION OF SUGGESTED SNIPPETS

(71) Applicant: Grammarly, Inc., San Francisco, CA (US)

(72) Inventor: Ben Mackey, San Francisco, CA (US)

(73) Assignee: Superhuman Platform Inc.

( * ) Notice: Subject to any disclaimer, the term of this patent is extended or adjusted under 35 U.S.C. 154(b) by 293 days.

(21) Appl. No.: 18/474,962

(22) Filed: Sep. 26, 2023

(65) Prior Publication Data

US 2024/0169148 A1    May 23, 2024

Related U.S. Application Data

(60) Provisional application No. 63/410,972, filed on Sep. 28, 2022.

(51) Int. Cl.
*G06F 40/20* (2020.01)
*G06F 16/335* (2019.01)
(Continued)

(52) U.S. Cl.
CPC ............ *G06F 40/20* (2020.01); *G06F 16/335* (2019.01); *G06F 40/131* (2020.01);
(Continued)

(58) Field of Classification Search
CPC ...... G06F 40/20; G06F 16/335; G06F 40/131; G06F 40/279; G06F 40/166; H04L 9/3239
See application file for complete search history.

(56) References Cited

U.S. PATENT DOCUMENTS 7,953,752 B2 *    5/2011    Soules ................ G06F 16/1734
                                                    715/204
8,122,069 B2 *    2/2012    Soules .................... G06F 16/14
                                                    707/821

(Continued)

OTHER PUBLICATIONS

Zhang, Yun, Zong-ze Jin, Wei-min Mu, and Wei-ping Wang, "Research of Distinct Algorithm of Short Text Based on Simhash", Sep. 2017, 2017 International Conference on Optics, Electronics and Communications Technology (OECT 2017), pp. 120-126. (Year: 2017).*

(Continued)

*Primary Examiner* — Daniel C Washburn
*Assistant Examiner* — James Boggs
(74) *Attorney, Agent, or Firm* — Van Hoven PC; Jordan Becker

(57) ABSTRACT

In one embodiment, a method receives, by a computing device, a text change in a text entry which includes one or more text units. The method may access, using a data store, a record associated with a user identifier which includes one or more top N similar hash values associated with the user identifier. The method may determine one or more hash values by applying a hash function over the one or more text units of the text change. The method may compare each of the one or more hash values to the one or more top N similar hash values. In response to determining a match between at least one of the one or more hash values and the one or more top N similar hash values, the method may determine a phrase suggestion using the text change to visually present on the computing device.

27 Claims, 4 Drawing Sheets

(51) Int. Cl.
    *G06F 40/131*        (2020.01)
    *G06F 40/166*        (2020.01)
    *G06F 40/279*        (2020.01)
    *H04L 9/32*           (2006.01)

(52) U.S. Cl.
    CPC .......... *G06F 40/166* (2020.01); *G06F 40/279*
             (2020.01); *H04L 9/3239* (2013.01)

(56) References Cited

U.S. PATENT DOCUMENTS

| | | | | |
|---|---|---|---|---|
| 8,645,825 | B1 * | 2/2014 | Cornea | G06F 40/232 |
| | | | | 715/257 |
| 9,183,323 | B1 * | 11/2015 | Shaw | G06F 16/3325 |
| 10,210,243 | B2 * | 2/2019 | Su | G06F 16/3322 |
| 11,023,503 | B2 * | 6/2021 | Satterfield | G06F 40/169 |
| 11,182,540 | B2 * | 11/2021 | Satterfield | G06F 40/186 |
| 11,449,554 | B2 | 9/2022 | Juarez et al. | |
| 2016/0125071 | A1 | 5/2016 | Gabbai | |
| 2017/0351687 | A1 | 12/2017 | Su et al. | |
| 2018/0101599 | A1 * | 4/2018 | Arnold | G06F 40/274 |
| 2020/0342164 | A1 | 10/2020 | Satterfield et al. | |

OTHER PUBLICATIONS

International Search Report and Written Opinion, Application No. PCT/US2023/075124, Jan. 25, 2024, 9 pages.
International Preliminary Report on Patentability for International Application No. PCT/US2023/075124, dated Apr. 10, 2025, 6 Pages.

\* cited by examiner

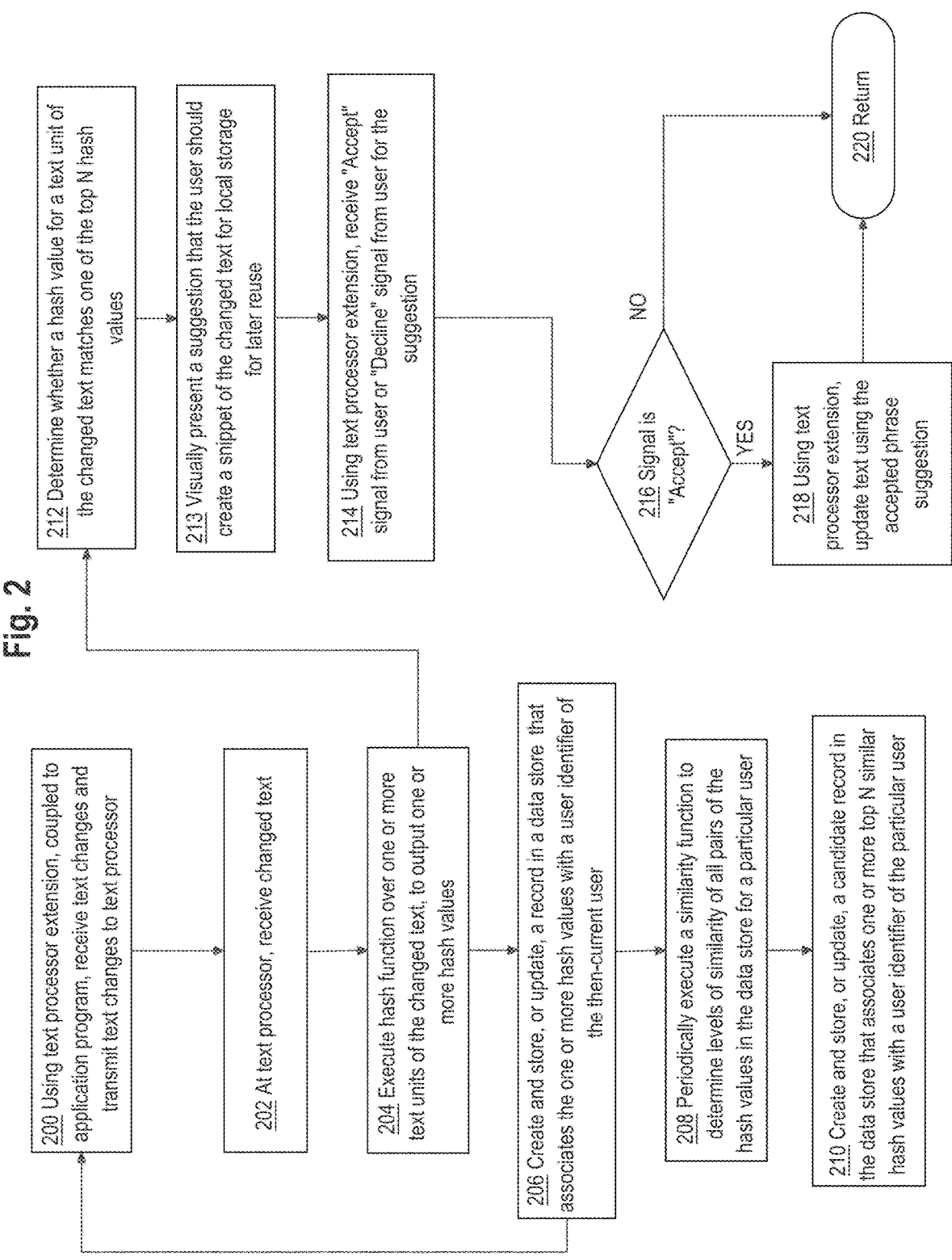

200 Using text processor extension, coupled to application program, receive text changes and transmit text changes to text processor 202 At text processor, receive changed text 204 Execute hash function over one or more text units of the changed text, to output one or more hash values 206 Create and store, or update, a record in a data store that associates the one or more hash values with a user identifier of the then-current user 208 Periodically execute a similarity function to determine levels of similarity of all pairs of the hash values in the data store for a particular user 210 Create and store, or update, a candidate record in the data store that associates one or more top N similar hash values with a user identifier of the particular user 212 Determine whether a hash value for a text unit of the changed text matches one of the top N hash values 213 Visually present a suggestion that the user should create a snippet of the changed text for local storage for later reuse 214 Using text processor extension, receive "Accept" signal from user or "Decline" signal from user for the suggestion 216 Signal is "Accept"?

NO

YES

218 Using text processor extension, update text using the accepted phrase suggestion 220 Return

PRIVACY-CONTROLLED GENERATION OF SUGGESTED SNIPPETS

BENEFIT CLAIM

This application claims the benefit under 35 U.S.C. § 119 of provisional application 63/410,972, filed Sep. 28, 2022, the entire contents of which are hereby incorporated by reference for all purposes as if fully set forth herein.

COPYRIGHT NOTICE

TECHNICAL FIELD

One technical field of the present disclosure is computer-implemented natural language processing via artificial intelligence and machine learning. Another technical field is computer-implemented writing support tools.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some domains of writing, such as business writing and technical writing, may require the writer to write identical or similar clauses, phrases, or sentences repeatedly in different communications directed to different recipients. Computers have become ubiquitous in these domains, and the manual keyboard continues to comprise the primary input device of the user. Consequently, writing identical or similar clauses, phrases, or sentences repeatedly can be physically taxing as well as mentally tedious or exhausting. These domains and other domains need a technical solution that can make repetitive writing easier and more efficient.

In one approach, a user can create a file, spreadsheet, or other digital record of multiple different phrases that the user plans to use repeatedly. A phrase can be termed a "snippet" of text. However, this approach and others suffer from the so-called "cold start" problem: the user begins with a blank document, and has to supply all the phrases manually to build a useful library. Several techniques can address the cold start problem for snippets. In one approach, a user or enterprise can pre-populate a snippets library with a set of generic snippets, such as greetings, and user can select from the preset library. While this approach helps, it is inadequate because few snippets are both universal and high value. Generic greetings, for instance, can sound "canned" and are already short to type.

A second approach is to create industry- or business-function-specific snippet collections. This requires extensive research to understand which snippets work in each industry. It also does not scale; adding another industry or business function requires more manual work. A third, related approach is to ask administrators or managers in an enterprise to create snippets for their department. However, this approach is burdensome for users. Setting up a snippets library from scratch requires significant effort as well as expertise in the domain or field.

Relevant literature includes:

1. G. Manku et al., "Detecting Near-Duplicates for Web Crawling," Proceedings of WWW 2007, pp. 141-149, available online at http://www2007.org/papers/paper215.pdf.
2. B. Whitmore, "Simhash and solving the hamming distance problem: explained," dated Aug. 6, 2019, self-published in the website "The Briar: From the mind of Ben Whitmore," available online at http://benwhitmore.altervista.org/simhash-and-solving-the-hamming-distance-problem-explained/.

Certain releases of the GRAMMARLY BUSINESS service, commercially available from Grammarly, Inc., Kyiv, Ukraine, implemented the manual creation of text snippets as follows: "Hello! With Grammarly Business, you can create reusable blocks of text called Snippets to quickly enter often-used language to help your team communicate consistently and efficiently. To create a Snippet . . . go to the Admin panel, select [Snippets] and click on [Create Snippet]. Next, give the Snippet a name and type or paste in the block of text that you would like to use. Lastly, select the collection you would like to save the Snippet to. By default, Snippets in the Personal collection are only accessible to you. And click [Save]. You can see the Snippet has been created in the [Personal] folder. To use a Snippet, open any application and type the keyboard shortcut (the default is the backslash, but it can be changed to whatever you would like), search for the Snippet, and hit enter. The snippet text appears without you having to type it out, or copy and paste it from another location."

Based on the foregoing, conducting repetitive writing tasks could benefit significantly if automatic, machine-implemented techniques could create the library with little to no user involvement.

SUMMARY

The appended claims may serve as a summary of the invention.

BRIEF DESCRIPTION OF THE DRAWINGS

In the drawings:

FIG. 2 illustrates an example computer-implemented process that can be programmed for automatically identifying repeatedly entered text units, privately storing digital representations of the text units, and suggesting the creation of a text unit for a repeatedly entered text unit.

DETAILED DESCRIPTION

1. General Overview

Figure 1:
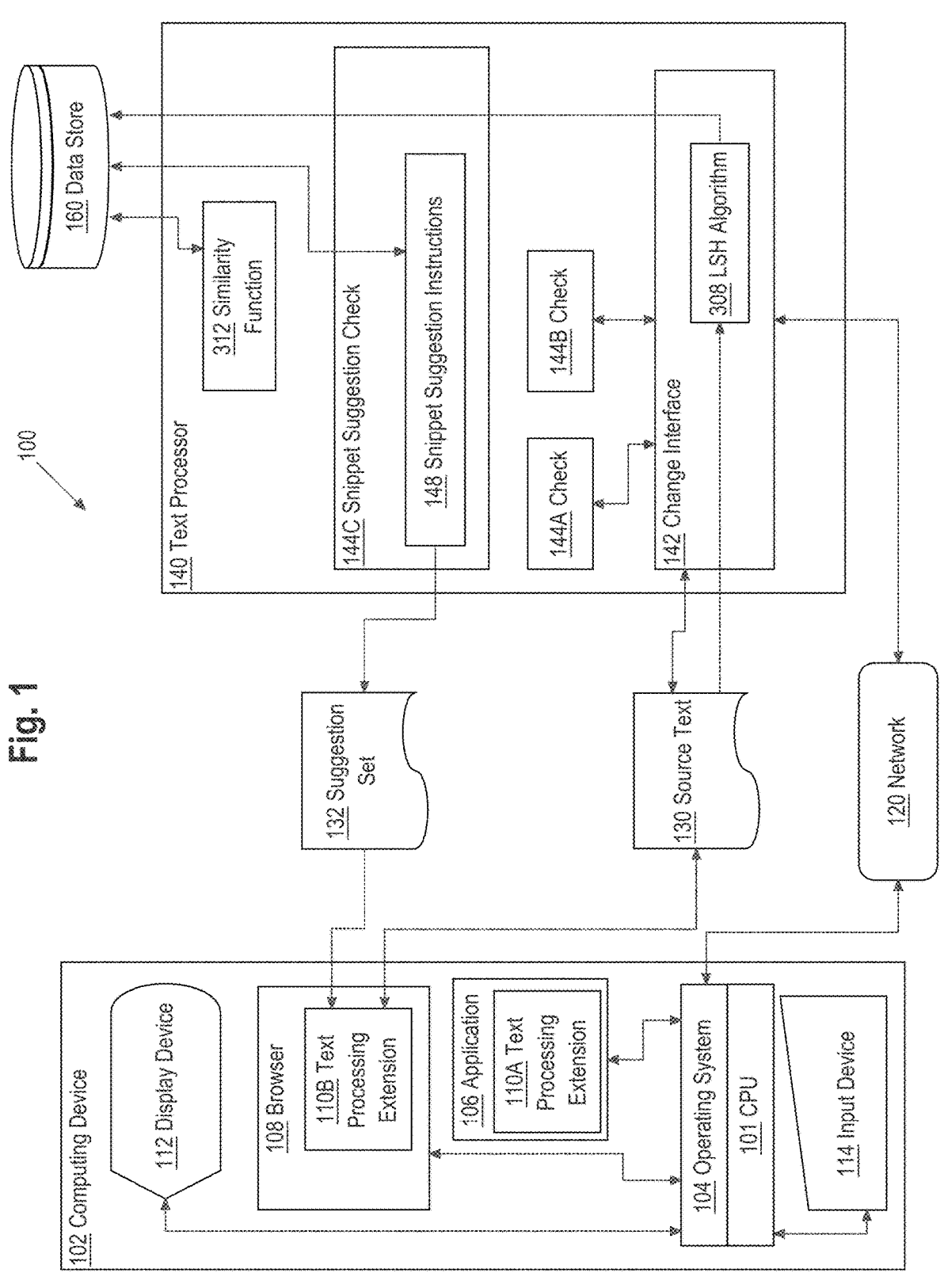
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis of interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to more fully illustrate one or more aspects of the inventions. Similarly, although process steps, method steps, algorithms or the like may be described in a sequential order, such processes, methods and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

In an embodiment, a computer-implemented text suggestion process is programmed to receive new text that a user enters in a text entry panel, browser form or HTML form, application window, or UI widget, to automatically execute a hash algorithm over one or more text units represented in the new text, and to store output hash values for the text units in a digital repository in records associated with user identifiers. The text suggestion process is programmed to periodically read all the hash values, execute a similarity algorithm in relation to multiple different pairs of hash values, and output similarity values representing a level of similarity of the hash values. The text suggestion process is programmed to rank or sort the hash values to select and store additional records of the top N hash values that represent the text that the user most frequently uses. The text suggestion process is programmed to detect another entry of new text, execute a hash value over text units of it, determine whether the data repository stores candidate hash values that are similar to the new hash value, and if so, generate and present a suggestion that the user should add a particular text unit to a user library of text snippets. In this manner, the text suggestion process is programmed to automatically detect frequently used or repeated text units and suggest the creation of text snippets, thereby solving the cold start problem. Once the user has built a personal library of available text snippets, the text suggestion process is programmed to enable the user of a writing application to quickly choose from the library of pre-defined text to insert into a chat window, document window, word processor document, or other application. Such a process offers relief from repetitive typing, and reduces or eliminates the risk of a typographical error when communicating with a recipient.

2. Structural & Functional Overview

2.1 Distributed Computer System Example

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of automatically suggesting snippets of frequently used text to a user in association with a writing or text preparation application In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

At runtime, one or more of application 106 and browser 108 load, or are installed with, a text processing extension 110A. 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with a host application 106 or browser 108.

In some embodiments, a text processing extension 110A may install as a stand-alone application that communicates programmatically with either or both of the operating system

104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A. 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. For example, change interface 142 may receive a text change in a text entry in a text entry window, panel, or field of the browser 108 or an application 106. The text change includes one or more text units. Text processor 140 may determine one or more hash values associated with the text change by applying a hash function over the one or more text units of the text change based on a locality-sensitive hash (LSH) algorithm. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads. The change interface 142 also is programmed to execute an LSH algorithm 308 over each text unit of the source text 130 that the change interface receives; the use of the LSH algorithm in connection with automated identification of suggested snippets of text is described further in other sections herein. A text unit may be a word, clause, phrase, sentence, or set of sentences, in various embodiments, or in the same embodiment.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a snippet suggestion check, and therefore it is also denoted "snippet suggestion check 144C" in this description.

In an embodiment, snippet suggestion check 144C comprises snippet suggestion instructions 148, which interoperate with a data store 160. The data store 160 can be implemented partially in main memory, using technologies such as Redis, and in long-term storage technologies in non-volatile storage devices such as cloud-based disk storage. The data store 160 can be integrated with text processor 140 or implemented as separate storage. In an embodiment, data store 160 comprises a database, flat file system, object store, or another digital data repository. The data store 160 can be configured using a table schema or other data storage schema to store a plurality of records, each record comprising at least one or more hash values of text units, in association with user identifiers. For example, data store 160 includes one or more top N similar hash values associated with a user identifier. Text processor 140 may access the plurality of records in data store 160 to compare each of the one or more hash values associated with the text change to the one or more top N similar hash values associated with the user identifier. In response to determining a match between at least one of the one or more hash values associated with the text change and the one or more top N similar hash values associated with the user identifier, text processor 140 may determine a phrase suggestion using the text change for the data store. Thus, text processor 140 may visually present the phrase suggestion to a display device 102 of the computing device 102 for the user to review the phrase suggestion.

In some embodiments, snippet suggestion instructions 148 are programmed to create and store, or update, a record in the data store that associates the one or more hash values with the user identifier. Text processor 140 may determine a plurality of levels of similarity by periodically applying a similarity function to all pairs of hash values associated with the user identifier in the data store. Text processor 140 may rank the plurality of levels of similarity to select the one or more top N similar hash values associated with the user identifier that represent text that the user identifier most frequently uses. As a result, text processor 140 may create and store, or update, a candidate record in the data store 160 that associates one or more top N similar hash values with the user identifier.

In some embodiment, text processor 140 further comprises a set of stored program instructions that implement a similarity function 312, which can be configured as a scheduled job to periodically read and transform or use data in data store 160. Text processor 140 may implement the similarity function 312 to calculate a plurality of distances for all pairs of the hash values associated with the user identifier in the data store 160. For example, text processor 140 may apply the similarity function 312 to determine that two hashes are similar when a distance is less than a predefined threshold. The distance includes one of cosine distance, Euclidean distance, and Hamming distance.

In some embodiment, text processor 140 further comprises a set of stored program instructions that receive a signal from the user to reject or accept the phrase suggestion from the display device 112 of the computing device 102. When the user accepts the phrase suggestion in the display device 112, text processor 140 may receive the signal to update the text entry using the phrase suggestion. As a result, text processor 140 may efficiently interact with the user to continuously determine recommendations to update the top N similar hash values with the user identifier in data store 160. For example, text processor 140 may generate a snippet suggestion instruction to recommend that the computing device 102 creates a snippet based on the phrase suggestion. As another example, text processor 140 may generate a snippet suggestion instruction to send a snippet suggestion instruction to the computing device 102 to present the snippet to the user via a user interface, such display device 112.

As further described herein for FIG. 2, in an embodiment, phrase suggestion instructions 148 are programmed, in part, to output a suggestion set 132 to transmit to text processing extension 110B. The suggestion set 132 comprises one or more suggestions of candidate snippets of text that the user of computing device 102 may wish to substitute for or add to the source text 130.

2.2 Similarity-Based Hash and Comparison Process

In one embodiment, a text processor is programmed to detect text units that a user frequently uses, and in response, to suggest that user authorize the text processor to digitally store a secure representation of the frequently used text unit as a snippet for future use. The text processor also can be programmed to detect, at any point after one secure representation is stored, that the user is typing or writing a frequently used text and to suggest the complete frequently used text unit. In response to user input specifying an acceptance of the suggestion, the text processor is programmed to automatically substitute the complete frequently used text unit into the then-current text. In an embodiment, a user can accept a suggestion with a single selection or click in a graphical user interface.

In various embodiments, a text unit can comprise a clause, a phrase, a sentence, or a set of multiple sentences.

In this manner, the text processor is programmed to recommend new snippets to users based on their writing habits. When the user is typing some text that they have frequently typed in the past, the text processor is programmed to suggest that they create a snippet with one click. The approach solves the cold-start problem without trying to pre-populate a library, in a scalable manner. The approach also is programmed to detect users' frequently used sentences without actually storing user texts, thereby preserving the privacy of users.

In an embodiment, the text processor is programmed to detect a frequently used text unit even when a user writes the same communication using slightly different words. For instance, consider the two sentences "Please let me know how it goes." and "Let me know how it went." If the user types "Let me know how it goes." next time, then the text processor should be programmed to suggest creating a snippet, based upon detecting that the user has typed two very similar sentences in the past. In one embodiment, the text processor can be programmed to detect each text unit that the user creates and to digitally store a digital representation of each text unit. As the user creates other text units, the text processor is programmed to create a new digital representation of that text unit, and to search digital storage to determine whether another, previously stored digital representation is identical to or similar to the new digital representation. If a match occurs, then the text processor is programmed to suggest creating a snippet.

In one embodiment, each digital representation of a text unit comprises a hash value formed by calculating a one-way hash over the text unit. In an embodiment, the hash value is calculated using a locality-sensitive hash (LSH)

algorithm. LSH hashing algorithms have three key properties: The hash function should return the same hash value for the same objects, so it should not change over time or because of other factors; the hash function should not return the same value for all objects, and most hash functions have a low "collision property," which refers to the likelihood that two different objects produce the same hash value; and similar objects should have similar hashes.

FIG. 2 illustrates an example computer-implemented process that can be programmed for automatically identifying repeatedly entered text units, privately storing digital representations of the text units, and suggesting the creation of a text unit for a repeatedly entered text unit. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In the example of FIG. 2, at block 200, the process is programmed, using a text processor extension coupled to an application program or browser, receive text changes and transmit the text changes to a text processor. For example, a user of computing device 102 enters text in a text entry window, panel, or field of the browser 108 or an application 106; one of the text processing extensions 110A, 110B detects the changed text; and one of the text processing extensions 110A, 110B programmatically calls back to the change interface 142 and provides source text 130 as a payload in a call. Calls can include an HTTP POST request with the source text 130 in a parameter value or attribute value or payload or an API call in which the source text is packaged in a designated field.

At block 202, the process is programmed to receive the changed text at the text processor. For example, change interface 142 receives the source text 130. At block 204, the process is programmed to execute a hash function over one or more text units of the changed text, to output one or more hash values. For example, change interface 142 invokes LSH algorithm 308 over the source text 130, resulting in outputting one or more hash values corresponding to one or more text units of the source text 130.

At block 206, the process is programmed to create and store a record in a data store that associates the one or more hash values with a user identifier of the then-current user. Block 206 also can include querying the data store to determine if a record for the then-current user already exists, and in response, updating the record rather than creating a new record. Text processor 140 will have access to the user identifier of the then-current identifier based on a prior login or authentication process in which computing device 102 gains access to the text processor; for example, a username and password login process can precede the execution of FIG. 2, resulting in storing a user identifier of a user of computing device 102 in main memory of a computer hosting the text processor 140. Block 206 then can retrieve the user identifier using a function call to a system service or API of the text processor 140.

From block 206, control can return to block 200 at which the process of block 200, block 202, block 204, block 206 repeats for one or more other sets of changed text. After completion the process of those blocks numerous times over a period, such as an hour, set of hours, day, set of days, week, or set of weeks, the data store is updated with records for users in association with large numbers of hash values corresponding to all text units that the users entered in the period.

Immediately thereafter or asynchronously with respect to the preceding blocks, that is, at any time thereafter, at block 208, the process is programmed to execute a similarity function to determine levels of similarity of all pairs of the hash values in the data store for a particular user. For example, similarity function 312 can execute as a scheduled job at the end of a specified period to determine levels of similarity of all pairs of the hash values in the data store for a particular user. At block 210, the process is programmed to create and store, or update, a candidate record in the data store that associates one or more top N similar hash values with a user identifier of the particular user. Block 210 can include sorting or ranking the hash values. The candidate record will be more compact than the record(s) created at block 206, by including only the top N similar hash values. These hash values represent the most frequently repetitively entered units of text of the user for the period. The value of N can vary in different embodiments.

At block 212, the process is programmed to determine whether a hash value for a text unit of the changed text matches one of the top N hash values. At block 213, the process is programmed to visually present a suggestion that the user should create a snippet of the changed text for local storage for later reuse.

At block 214, the process is programmed to use the text processor extension to receive an "Accept" signal from user or "Decline" signal from user for the suggestion. At block 216, if the signal is "Accept"?, then control transfers to block 218 where, using the text processor extension, the process is programmed to update text using the accepted phrase suggestion. At block 220, control can return to block 220 or to other processes.

Figure 3:
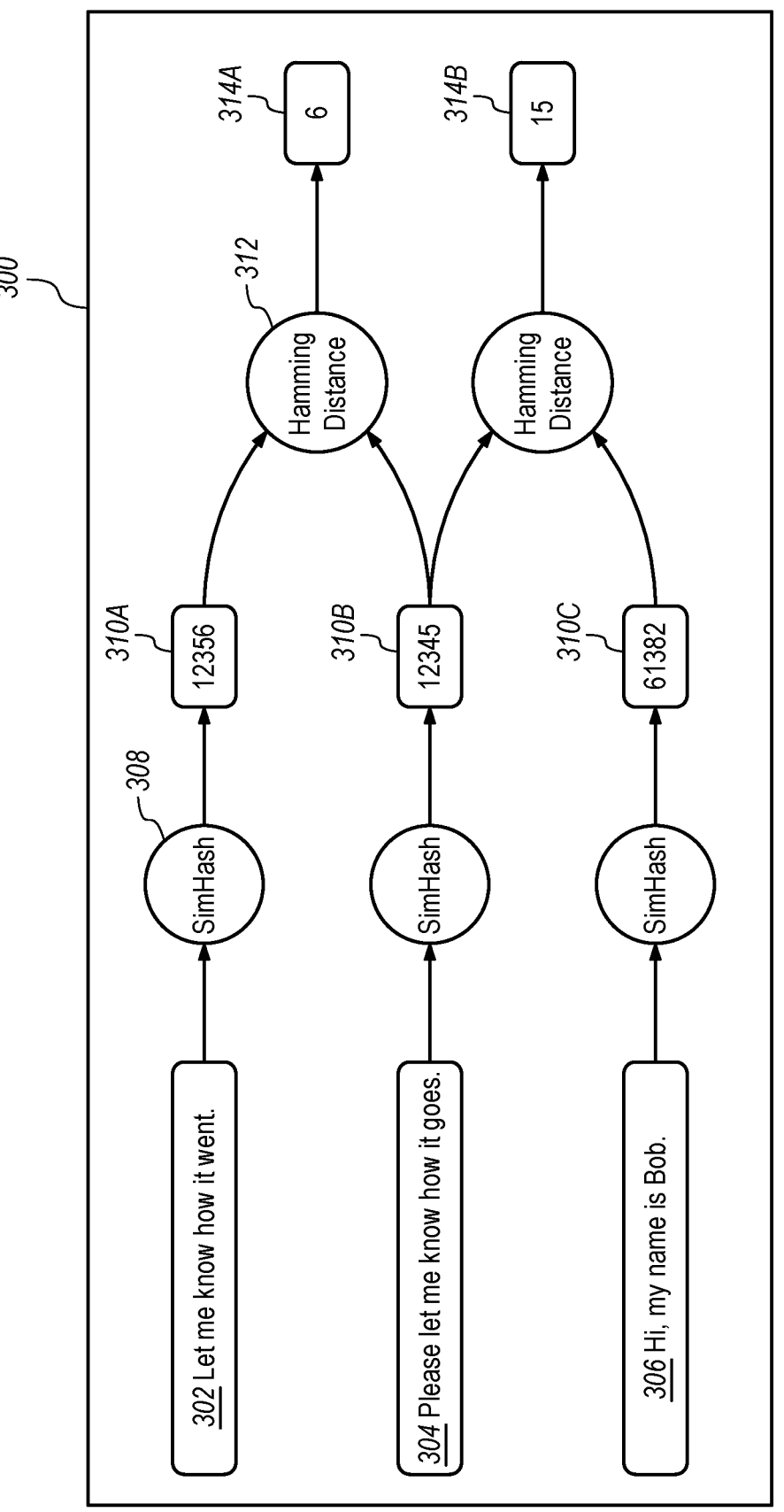
FIG. 3 illustrates data flows in an example of computer-implemented processing of three sentences.

FIG. 3 illustrates data flows 300 in an example of computer-implemented processing of three sentences. In the example of FIG. 3, the text processor 140 receives three sentences 302, 304, 306 having the form "Please let me know how it goes.", "Let me know how it went." and "Hi, my name is Bob." An LSH algorithm 308, such as SIMHASH, is invoked programmatically to calculate a hash value over each of the sentences 302, 304, 306, yielding output hash values 310A, 310B, 310C, respectively. The text processor 140 is programmed to invoke a similarity function 312 and provide a first pair of hash values 310A, 310B as a first input and a second pair of hash values 310B, 310C as a second input, yielding output similarity values 314A, 314B. Similarity function 312 can be programmed to compare two hash values based upon a distance algorithm. In the example, a first output similarity value 314A is "6" and a second output similarity value 314B is "15". Therefore, the first two sentences 302, 304 are more similar than the second sentence 304 and the third sentence 306.

In various embodiments, LSH algorithm 308 can use open-source code for any of several implementations of LSH for text data, such as MinHash and SimHash. Experiments have shown that SimHash performs faster than MinHash, and may be more suitable for LSH algorithm 308 in a real-time suggestion system or online writing assistant to provide suggestions immediately without disrupting the flow of writing. The similarity function 312 can be programmed to implement any of several distance algorithms, such as cosine distance, Euclidean distance, or Hamming distance. With the foregoing arrangement, text processor 140 can process user texts without storing text on a server computer that hosts the text processor, since the text processor can store the hashed version of user text instead of the raw text.

2.3 Architecture Example

LSH algorithm 308 and similarity function 312 can be programmed as methods, classes, functions, or other sets of stored program instructions as part of change interface 142 and snippet suggestion instructions 148 (FIG. 1). As seen in FIG. 1, text processor 140 implements multiple different text-checking features via checks 144A, 144B, 144C. In this manner, various text-checking are spread across multiple services, but change interface 142 acts as one common entry point for all text-checking requests and is responsible for receiving the source text 130 and distributing it to multiple checks 144A, 144B, 144C for processing. In an embodiment, change interface 142 is programmed to compute SimHash values for all sentences of the source text 130 as they arrive at the change interface. Logically, the transformation can be expressed as the following tuple:

(userId, [sentence1, sentence2, sentence3])→(userId, [hash1, hash2, hash3])

In an embodiment, the hashed text is digitally sent to data store 160, which can implement long-term storage such as weekly events data for batch processing. A scheduled program job, such as a Spark job, can execute the snippet suggestion instructions 148 daily over the data store 160 to find frequently used sentence hash values. The job takes all the hash values for a particular user based on the sentences that the change interface 142 received in the past week and compares them with each other by executing the similarity function 312. The similarity function 312 can be programmed to determine that two sentence hashes are similar if their Hamming distance is less than a predefined threshold. Output of the similarity function 312 will be the top N sentence hashes that had more than M similar hashes during the week. In an embodiment, snippet suggestion instructions 148 is programmed to store the top N sentence hashes in data store 160; in some embodiments, such candidates can be stored in a Redis repository as hash values in the same format. Records in the Redis store can have the format:

Key: userId, Value: [hash1, hash2, hash3]

Using Redis as a repository provides fast access as all data is stored in main memory of a server computer that hosts the text processor 140. In an embodiment, as a user enters text, the change interface 142 executes LSH algorithm 308 to compute hash values for text units, and calls snippet suggestion check 144C. In response, the snippet suggestion instructions 148 execute to query data store 160, such as a Redis repository in memory, to inspect the Top N frequent hashed user sentences. Snippet suggestion instructions 148 are further programmed to check whether the user's text contains any candidates for snippets. If candidates are found, then snippet suggestion instructions 148 generates a suggestion set 132 that recommends adding the text as a snippet. The suggestion set 132 can be output in a suggestion panel, alert, notification, UI widget, or other display element, based on one of the text processing extensions 110A, 110B interoperating with the browser 108 or application 106, or invoking services of operating system 104 to cause displaying the suggestions on display device 112.

If the user accepts a suggestion in the suggestion set 132, then one of the text processing extensions 110A, 110B that the user is then-currently using can be programmed to locally store the text as a snippet. Users can select and use snippets from local storage using other features or functions of the text processing extensions 110A, 110B. For example, the text processing extensions 110A, 110B can implement hotkeys, graphical user interface widgets, suggestion panels with lists, or other user interface elements that display available snippets, accept user input to select a snippet, and copy or transfer a selected snippet into a text box, editing window, or other workspace in which the user has been entering or writing text.

For example, if the user types "Let me know how it goes." and they have previously typed "Please let me know how it goes." and "Let me know how it went." the snippet suggestion instructions 148 could operate to recommend that the user create a snippet for the "Let me know how it goes." text. The foregoing process executes without ever storing what the user typed or entered, because only the hash values of text units have been stored.

2.4 Optimizations

Experiments have found that if the user edits the same long document multiple times during the week, many snippet candidates will be detected, because the same text has been processed several times. In an embodiment, snippet suggestion instructions 148 could be programmed to receive context data about the text, for example, whether the current user authored the text. In some embodiments, change interface 142 is programmed to execute LSH algorithm 308 and/or invoke snippet suggestion check 144C for short-form documents.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
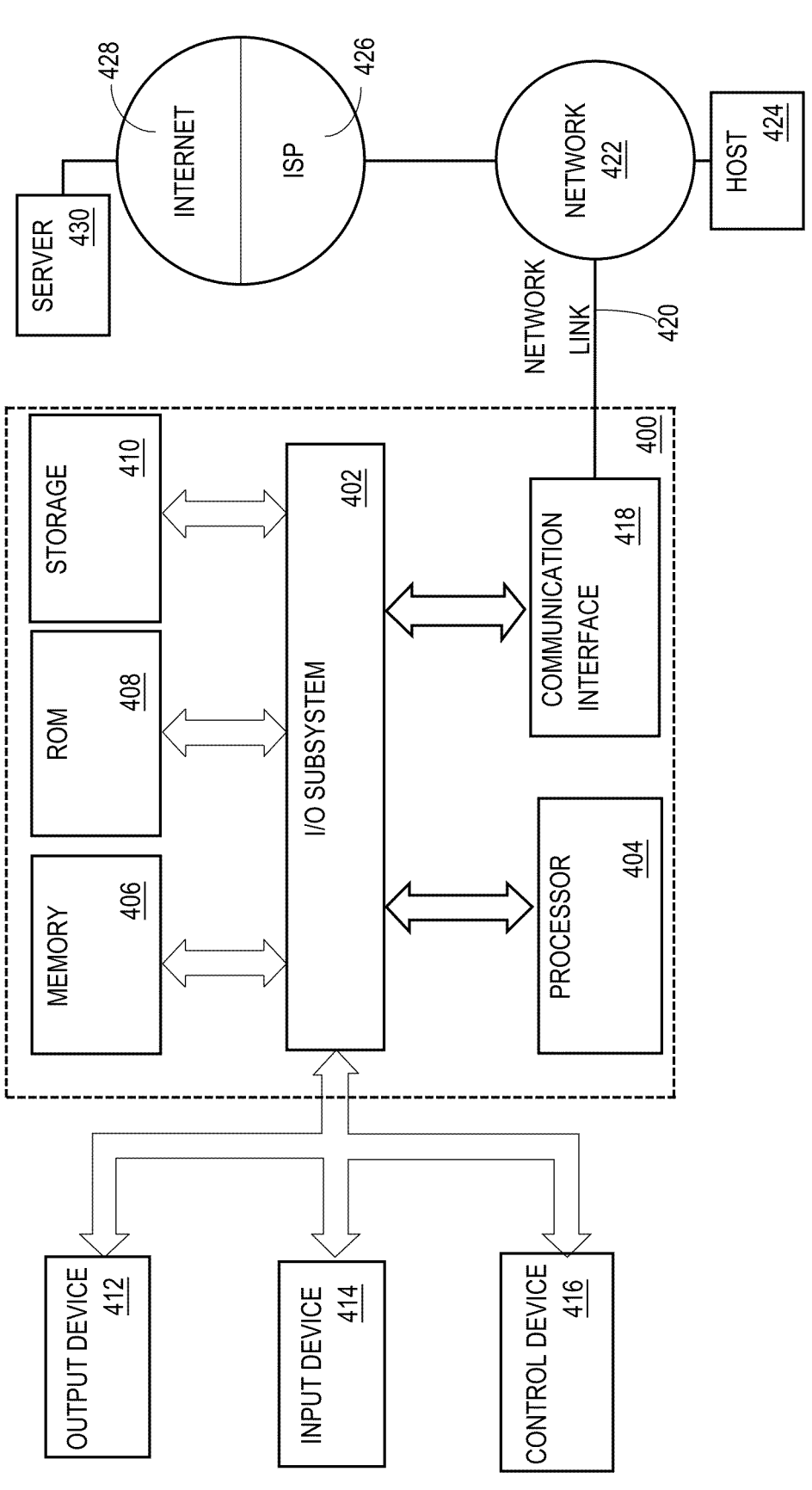
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on an output device 412 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IOT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to the bus of I/O subsystem 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electro-magnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

creating, by a computing device, a first record associated with a user identifier, the first record containing a plurality of hash values, each of the plurality of hash values corresponding to a separate one or more units of text, each of the one or more units of text having been previously input by a user;

applying, by a computing device, a similarity function to the plurality of hash values in the first record to determine a level of similarity between each pair of hash values in the plurality of hash values in the first record;

determining, by a computing device and based on a result of the applying the similarity function, a top N similar hash values among the plurality of hash values in the first record;

creating, by the computing device, a second record that contains the top N similar hash values in association with the user identifier but not all of the plurality of hash values in the first record, wherein the second record is smaller than the first record;

receiving, by the computing device, a text change in a text entry input by the user, the text change including one or more text units;

accessing, using a data store, the second record associated with a user identifier;

determining one or more hash values associated with the text change by applying a hash function over the one or more text units of the text change;

comparing each of the one or more hash values associated with the text change to the top N similar hash values in the second record associated with the user identifier; and in response to determining a match between at least one of the one or more hash values associated with the text change and at least one of the top N similar hash values in the second record associated with the user identifier, determining a phrase suggestion for the user to add the text change to the data store for subsequent reuse and visually presenting the phrase suggestion on the computing device.

2. The computer-implemented method of claim 1, further comprising:

determining a plurality of levels of similarity by periodically applying the similarity function to all pairs of hash values associated with the user identifier in the data store to determine periodically an updated top N similar hash values; and updating the second record or creating a new record in the data store, that associates the updated top N similar hash values with the user identifier.

3. The computer-implemented method of claim 2, further comprising ranking the plurality of levels of similarity to select the updated top N similar hash values associated with the user identifier that represent text that the user most frequently uses.

4. The computer-implemented method of claim 2, further comprising determining a plurality of distances for all pairs of the hash values associated with the user identifier in the data store.

5. The computer-implemented method of claim 4, further comprising determining that two hash values are similar when a distance is less than a predefined threshold.

6. The computer-implemented method of claim 5, wherein the distance includes one of a cosine distance, a Euclidean distance, or a Hamming distance.

7. The computer-implemented method of claim 1, further comprising:

receiving a signal to accept the phrase suggestion from the computing device; and in response to determining the phrase suggestion is accepted, updating the data store by using the phrase suggestion.

8. The computer-implemented method of claim 1, further comprising calculating the one or more hash values associated with the text change by using a locality-sensitive hash (LSH) algorithm.

9. The computer-implemented method of claim 1, wherein the suggestion is a snippet suggestion to recommend that the computing device creates a snippet based on the phrase suggestion, the method further comprising:

sending a snippet suggestion instruction corresponding to the snippet suggestion to the computing device to present to the computing device via a user interface.

10. A system comprising:

one or more processors; and a memory coupled to the one or more processors comprising instructions, execution of which by the one or more processors causes the system to:

create a first record associated with a user identifier, the first record containing a plurality of hash values, each of the plurality of hash values corresponding to a separate one or more units of text, each of the one or more units of text having been previously input by a user;

apply a similarity function to the plurality of hash values in the first record to determine a level of similarity between each pair of hash values in the plurality of hash values in the first record;

determine, based on a result of applying the similarity function, a top N similar hash values among the plurality of hash values in the first record;

create a second record that contains the top N similar hash values in association with the user identifier but not all of the plurality of hash values in the first record, wherein the second record is smaller than the first record;

receive, by a computing device, a text change in a text entry input by the user, the text change including one or more text units;

access, using a data store, the second record associated with a user identifier;

determine one or more hash values associated with the text change by applying a hash function over the one or more text units of the text change;

compare each of the one or more hash values associated with the text change to the top N similar hash values in the second record associated with the user identifier; and in response to determining a match between at least one of the one or more hash values associated with the text change and at least one of the top N similar hash values in the second record associated with the user identifier, determine a phrase suggestion for the user to add the text change to the data store for subsequent reuse and visually presenting the phrase suggestion on the computing device.

11. The system of claim 10, wherein execution of the instructions by the one or more processors further causes the system to:

determine a plurality of levels of similarity by periodically applying the similarity function to all pairs of hash values associated with the user identifier in the data store to determine periodically an updated top N similar hash values; and update the second record or creating a new record in the data store, that associates the updated top N similar hash values with the user identifier.

12. The system of claim 11, wherein the processors are further operable when executing the instructions to rank the plurality of levels of similarity to select the updated top N similar hash values associated with the user identifier that represent text that a user associated with the user most frequently uses.

13. The system of claim 11, wherein execution of the instructions by the one or more processors further causes the system to implement the similarity function to calculate a plurality of distances for all pairs of the hash values associated with the user identifier in the data store.

14. The system of claim 13, wherein execution of the instructions by the one or more processors further causes the system to apply the similarity function to determine that two hash values are similar when a distance is less than a predefined threshold.

15. The system of claim 14, wherein the distance includes one of a cosine distance, a Euclidean distance, or a Hamming distance.

16. The system of claim 10, wherein execution of the instructions by the one or more processors further causes the system to:

receive a signal to accept the phrase suggestion from the computing device; and in response to determining the phrase suggestion is accepted, update the data store by using the phrase suggestion.

17. The system of claim 10, wherein execution of the instructions by the one or more processors further causes the system to calculate the one or more hash values associated with the text change by using a locality-sensitive hash (LSH) algorithm.

18. The system of claim 10, wherein the suggestion is a snippet suggestion to recommend that the computing device creates a snippet based on the phrase suggestion, and wherein execution of the instructions by the one or more processors further causes the system to:

send a snippet suggestion instruction corresponding to the snippet suggestion to the computing device to present to the computing device via a user interface.

19. One or more non-transitory computer-readable storage media storing one or more sequences of instructions, execution of which by one or more processors causes the one or more processors to execute:

creating a first record associated with a user identifier, the first record containing a plurality of hash values, each of the plurality of hash values corresponding to a separate one or more units of text, each of the one or more units of text having been previously input by a user;

applying a similarity function to the plurality of hash values in the first record to determine a level of similarity between each pair of hash values in the plurality of hash values in the first record;

determining, based on a result of the applying the similarity function, a top N similar hash values among the plurality of hash values in the first record;

creating a second record that contains the top N similar hash values in association with the user identifier but not all of the plurality of hash values in the first record, wherein the second record is smaller than the first record;

receiving a text change in a text entry input by the user, the text change including one or more text units;

accessing, using a data store, the second record associated with a user identifier, determining one or more hash values associated with the text change by applying a hash function over the one or more text units of the text change;

comparing each of the one or more hash values associated with the text change to the top N similar hash values in the second record associated with the user identifier; and in response to determining a match between at least one of the one or more hash values associated with the text change and at least one of the top N similar hash values in the second record associated with the user identifier, determining a phrase suggestion for the user to add the text change to the data store for subsequent reuse and visually presenting the phrase suggestion on a computing device.

20. The one or more non-transitory computer-readable storage media of claim 19, wherein execution of the instructions by the one or more processors further causes the one or more processors to execute:

determining a plurality of levels of similarity by periodically applying the similarity function to all pairs of hash values associated with the user identifier in the data store to determine periodically an updated top N similar hash values; and updating the second record or creating a new record in the data store, that associates the updated top N similar hash values with the user identifier.

21. The one or more non-transitory computer-readable storage media of claim 20, wherein execution of the instructions by the one or more processors further causes the one or more processors to execute:

ranking the plurality of levels of similarity to select the updated top N similar hash values associated with the user identifier that represent text that the user most frequently uses.

22. The one or more non-transitory computer-readable storage media of claim 20, wherein execution of the instructions by the one or more processors further causes the one or more processors to execute:

implementing the similarity function to calculate a plurality of distances for all pairs of the hash values associated with the user identifier in the data store.

23. The one or more non-transitory computer-readable storage media of claim 22, wherein execution of the instructions by the one or more processors further causes the one or more processors to execute:

applying the similarity function to determine that two hash values are similar when a distance is less than a predefined threshold.

24. The one or more non-transitory computer-readable storage media of claim 23, wherein the distance includes one of a cosine distance, a Euclidean distance, or a Hamming distance.

25. The one or more non-transitory computer-readable storage media of claim 19, wherein execution of the instructions by the one or more processors further causes the one or more processors to execute:

receiving a signal to accept the phrase suggestion from the computing device; and in response to determining the phrase suggestion is accepted, updating the data store by using the phrase suggestion.

26. The one or more non-transitory computer-readable storage media of claim 19, wherein execution of the instructions by the one or more processors further causes the one or more processors to execute:

calculating the one or more hash values associated with the text change by using a locality-sensitive hash (LSH) algorithm.

27. The one or more non-transitory computer-readable storage media of claim 19, wherein the suggestion is a snippet suggestion to recommend that the computing device creates a snippet based on the phrase suggestion, and wherein execution of the instructions by the one or more processors further causes the one or more processors to execute:

sending a snippet suggestion instruction corresponding to the snippet suggestion to the computing device to present to the computing device via a user interface.

\* \* \* \* \*